United States Patent
Jahn et al.

(10) Patent No.: US 10,552,144 B2
(45) Date of Patent: Feb. 4, 2020

(54) METHOD FOR UPDATING FIRMWARE OF DEVICES

(71) Applicant: SCHNEIDER ELECTRIC AUTOMATION GMBH, Marktheidenfeld (DE)

(72) Inventors: Herwig Jahn, Mainhausen (DE); Michael Harnischfeger, Mömbris (DE)

(73) Assignee: SCHNEIDER ELECTRIC AUTOMATION GMBH, Marktheidenfeld (DE)

( * ) Notice: Subject to any disclaimer, the term of this patent is extended or adjusted under 35 U.S.C. 154(b) by 0 days.

(21) Appl. No.: 15/534,008

(22) PCT Filed: Dec. 10, 2015

(86) PCT No.: PCT/EP2015/079221
§ 371 (c)(1),
(2) Date: Aug. 18, 2017

(87) PCT Pub. No.: WO2016/092003
PCT Pub. Date: Jun. 16, 2016

(65) Prior Publication Data
US 2017/0351508 A1 Dec. 7, 2017

(30) Foreign Application Priority Data
Dec. 12, 2014 (DE) .................... 10 2014 118 546

(51) Int. Cl.
*G06F 8/654* (2018.01)
(52) U.S. Cl.
CPC .................... *G06F 8/654* (2018.02)

(58) Field of Classification Search
CPC ............ G06F 8/65; G06F 8/654; G06F 8/665
See application file for complete search history.

(56) References Cited

U.S. PATENT DOCUMENTS 7,293,169 B1 11/2007 Righi et al.
8,260,893 B1 * 9/2012 Bandhole ............ G06F 9/5083
709/221

(Continued)

FOREIGN PATENT DOCUMENTS

DE 10 2004 052 488 A1 5/2006
DE 10 2006 044 182 A1 3/2008

OTHER PUBLICATIONS

Non-English German Office Action dated Mar. 9, 2016 for German Application No. 10 2014 1189 546.3.

(Continued)

*Primary Examiner* — S. Sough
*Assistant Examiner* — Stephen D Berman
(74) *Attorney, Agent, or Firm* — Ladas & Parry LLP; Malcolm J. MacDonald

(57) ABSTRACT

The invention relates to a method for updating firmware of devices such as automation devices and/or energy management devices, including the process steps of: providing at least one firmware file; loading the at least one firmware file into a loading tool; connecting the loading tool to the device; and transferring the firmware file to the device in consideration of loading information. In order to enable the firmware updating of different devices by means of only one loading tool, the loading information according to the invention is hived off from the loading tool, stored in at least one external data source and loaded by the loading tool from the at least one external data source.

14 Claims, 10 Drawing Sheets

(56) References Cited

U.S. PATENT DOCUMENTS

Figure 3:
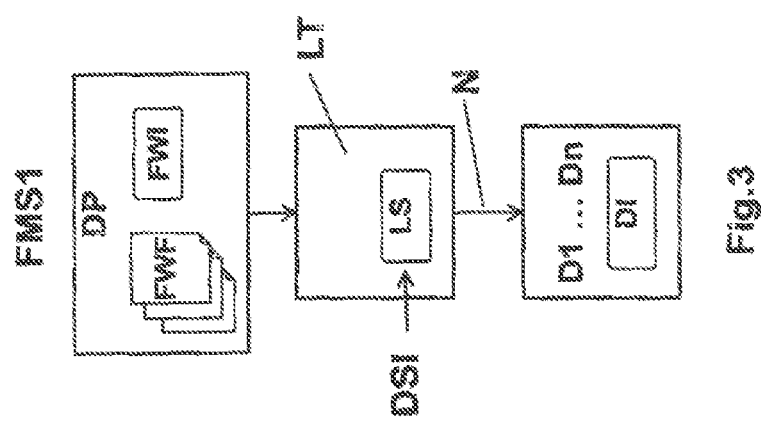

| | | | |
|---|---|---|---|
| 8,644,959 B2 | 2/2014 | Hermann | |
| 2004/0057464 A1* | 3/2004 | Sanders | H04L 29/06 |
| | | | 370/469 |
| 2005/0137997 A1* | 6/2005 | Bussert | G06F 8/65 |
| 2007/0261046 A1* | 11/2007 | Miller | G06F 8/65 |
| | | | 717/168 |
| 2014/0149973 A1 | 5/2014 | Walter et al. | |
| 2014/0173581 A1* | 6/2014 | Grinberg | G06F 8/654 |
| | | | 717/170 |
| 2014/0310698 A1* | 10/2014 | Lee | G06F 8/654 |
| | | | 717/168 |
| 2014/0336791 A1 | 11/2014 | Asenjo et al. | |
| 2015/0082297 A1* | 3/2015 | Parry | G06F 8/654 |
| | | | 717/173 |
| 2015/0113263 A1* | 4/2015 | Wu | G06F 8/654 |
| | | | 713/100 |
| 2015/0143098 A1* | 5/2015 | Arnold | G06F 8/654 |
| | | | 713/2 |

OTHER PUBLICATIONS

International Search Report and Written Opinion with English translation dated Mar. 15, 2016 for Application No. PCT/EP2015/079221.
Espacenet English abstract of DE 10 2004 052 488 A1.
Non-English German Office Action dated Mar. 9, 2016 for German Application No. 10 2014 118 546.3.

\* cited by examiner

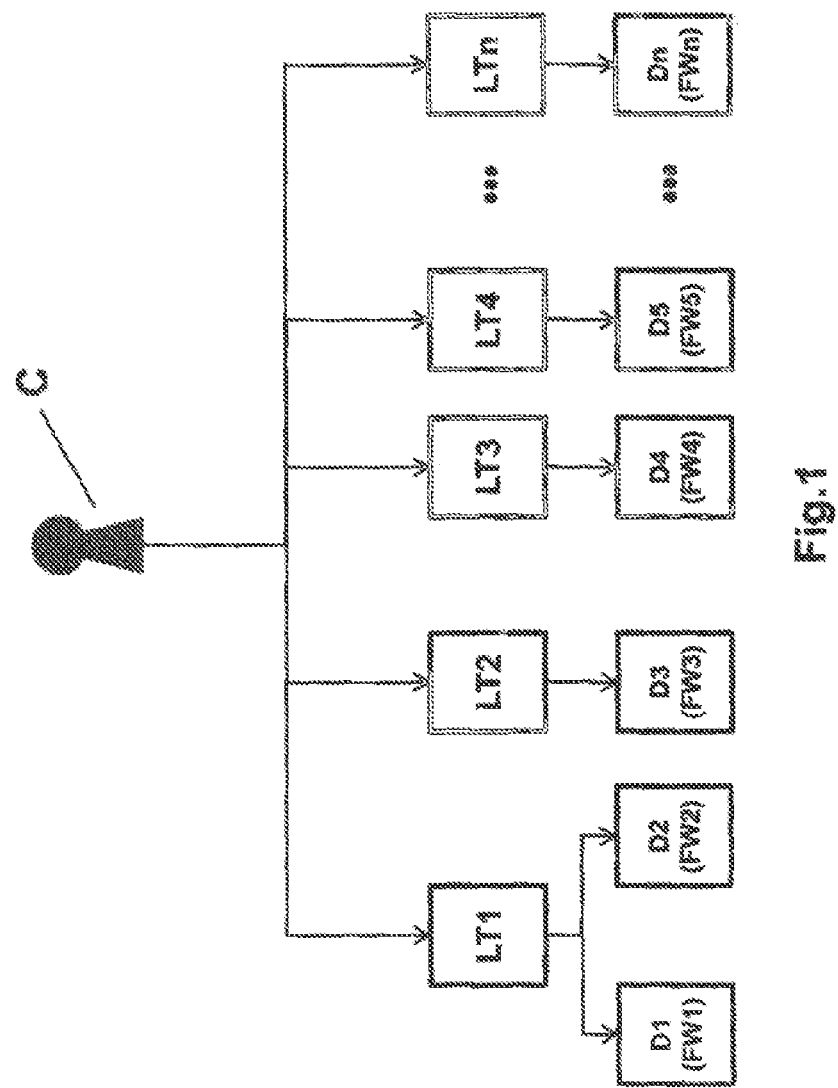

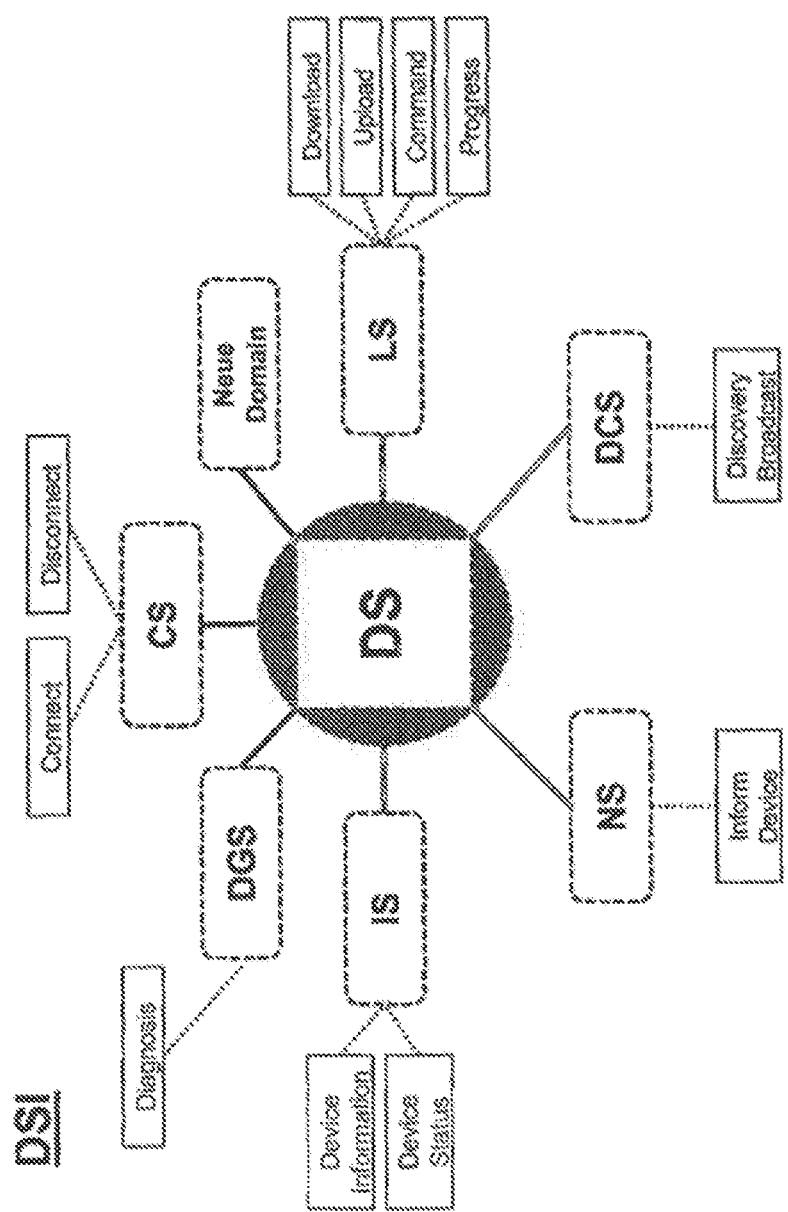

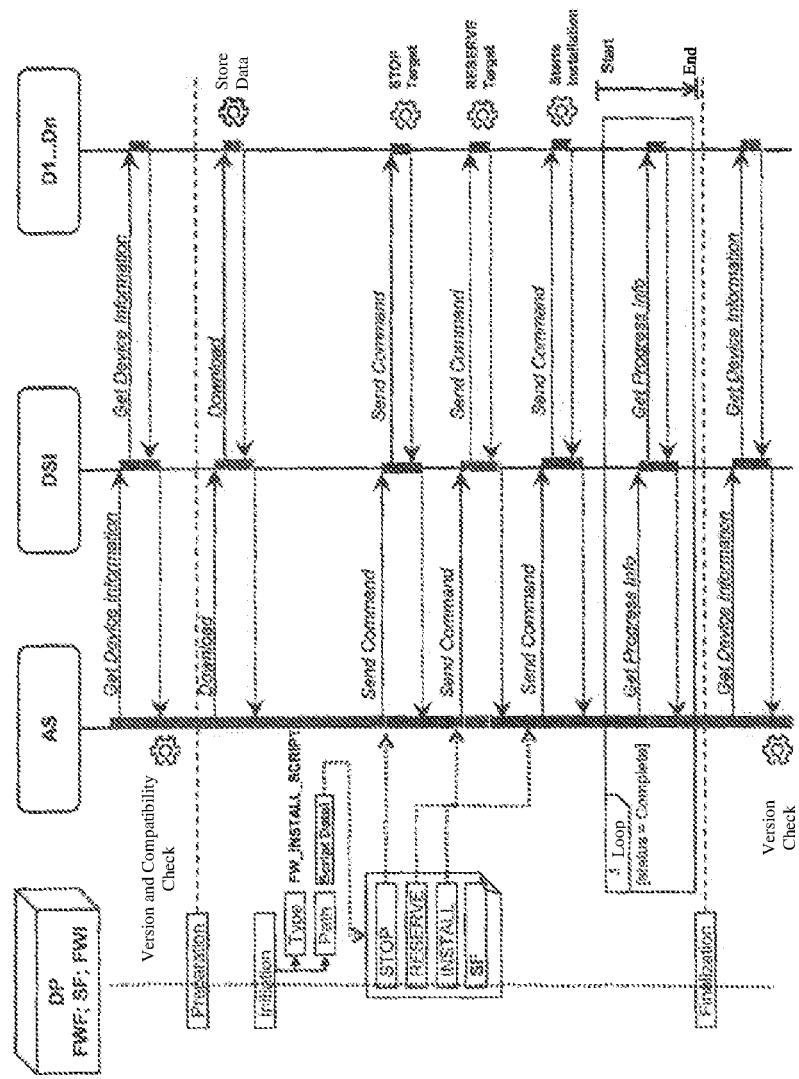

METHOD FOR UPDATING FIRMWARE OF DEVICES

The invention relates to a method for updating firmware of devices such as automation devices and/or energy management devices, comprising the process steps of:
providing at least one firmware file;
loading the at least one firmware file into a loading tool;
connecting the loading tool to the device; and
transferring the firmware file to the device in consideration of loading information.

A method of the type mentioned at the beginning is described in DE 10 2006 044 182 A1. For a need-based functionalization of control/regulation devices, in particular of motor control devices, at least one access means for the access to a first data storage as well as a control/regulation device with a second data storage is provided, wherein the first data storage comprises at least one function module by means of which a function and/or functionality of the control/regulation device can be executed. In the interaction of access means and a first data storage, at least one function module can be selectively transferred into the second data storage and/or stored for execution, wherein the overall functionality of the control/regulation device can be adapted flexibly by need-based selection of one or more function modules. For the need-based functionalization of the motor control device, using a need-based function selection executed in a process-preparing manner, one or more function modules stored in a database of the first data storage is/are selectively loaded into the motor control device. For this purpose it is necessary that, in a first step, a preparatory need-based function selection from several available functions is carried out by a user.

If several devices with different device properties are integrated in a network, it is very difficult, and almost impossible, for the user to know which of the connected automation devices requires which firmware update.

In addition, it should be taken into consideration that devices from different manufacturers use different loading tools and loading methods, so that the known system for the firmware updating of different devices is not suitable.

A method for updating firmware FW1 . . . FWn of devices D1 . . . Dn according to the prior art is represented purely diagrammatically in FIG. 1. The devices D1 . . . Dn are, for example, designed as control devices, sensors, circuit breakers, drives and/or programmable controls, each of which each contains a firmware FW1 . . . FWn which must be updated, if applicable, during the operating time of the device.

Since the devices D1 . . . Dn are of different type and have different properties, a specific loading tool LT1 . . . LTn is associated with each of the devices D, which has to be coupled in each case by a user C to the device D1 . . . Dn of which the firmware is to be updated. An example of a loading tool is the "Multi-Loader VW3 A8 121" or "Unity Loader" of the Schneider Electric Automation GmbH.

Figure 2:
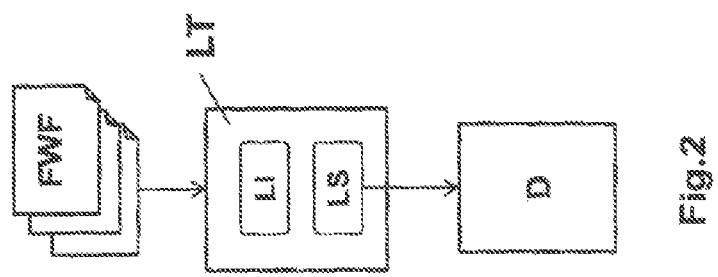

In the known method, according to FIG. 2, a firmware file FWF is provided and loaded into the loading tool LT. In the loading tool LT, loading information LI is stored, which, for example, contains information on dependencies of firmware files, an installation environment, process steps for performing the updates, communication information as well as device property information such as device type, firmware type as well as communication capacities of the device.

The loading tool LT is connected to the device D, wherein, via a specific loading interface and loading service LS, a communication with the device D is established, in order to load the firmware file FWF into the device D and, if applicable, monitor the installation of the firmware file.

The disadvantage in the known method is that, for different devices D1 . . . Dn in each case a distinct loading tool LT1 . . . LTn has to be used, which is associated with high time and cost expenditure for the user C.

Based on this, the underlying aim of the present invention is to develop a method of the type mentioned at the beginning, in such a manner that the firmware updating of different devices is enabled and substantially simplified.

The aim is achieved according to the invention in that the loading information, hived off from the loading tool, is stored in at least one external data source and loaded by the loading tool from the at least one external data source.

According to a preferred embodiment, it is provided that the loading information is provided as a firmware-specific loading information and/or device-specific loading information, that the device-specific loading information is loaded from the device to be updated, as first external data source, via a communication command into the loading tool, and that the firmware-specific loading information together with the firmware files is stored in a data packet, as second external data source, and loaded into the loading tool.

According to an alternative procedure, the device-specific loading information can be provided together with the firmware-specific loading information in the data packet and loaded into the loading tool.

The firmware-specific loading information preferably contains information such as type and identification number of the target devices, firmware version, type of communication protocols, type of loading modes and/or installation information. Several loading options can be present in a packet. This includes both different protocols and also different loading modes. Thus, it is also possible to address several devices to a product group/family with one packet, if they are all based on the same firmware file but support different protocols or loading modes.

The device-specific loading information preferably contains information such as a device ID, current firmware version, status information, storage information, communication protocols used, device-specific loading modes, installation information and/or dependencies and compatibility information or indications.

In an additional preferred procedure, the data packet can also contain script files which contain information on an adaptation of the loading process to, for example, special properties or behavioral patterns of target devices.

Preferably, the firmware-specific loading information and the device-specific loading information is interpreted before the start of the loading process by the loading tool, wherein, by comparison of the loading information, a loading process is selected with compatible loading information supported by the device and the data packet, and a uniform service communication interface of the loading tool corresponding to the matching loading information is established.

The underlying idea of the invention is to cause the loading tools to obtain knowledge on loading information and device property information in connection with the firmware updating, in order to adapt, on the basis of this information, the firmware downloading process and the format of the data in a flexible manner to the respective conditions, without having to perform an adaptation of the software of the loading tool and without having to use dedicated loading tools for the respective target automation devices.

By means of the method according to the invention, in comparison to the prior art, the advantage is achieved that the firmware updating of any devices using a single loading tool is made possible, without having to perform adaptations of the software of the loading tool. According to the prior art, the software of the loading tool had to be adapted for each new device type or new version of a product or product family, or a new loading tool had to be developed and used.

Consequently, the method according to the invention allows an updating of firmware of different devices having very different device properties without adaptation of the software of the loading tool.

According to an additional preferred embodiment, it is provided that, for uniform communication between loading tool and device, a uniform service communication interface with generic services is used, services which define a common set of device services via which the data and/or information in the form of service operations from and to the automation device is sent and received, respectively.

These device services are protocol-independent. Due to the concept of protocol-independent device services, a uniform approach for the communication between loading tools and device is achieved.

For controlling different activities, the device services can be subdivided into groups such as connection service, information service, data exchange service, notification service and/or diagnosis service. A service is defined in such a manner that it contains one or more operations, wherein the service describes an abstract purpose such as, for example, "domain device information," and an operation describes a concrete application case such as "reading device information."

For the support of different communication protocols, it is provided that the device services can be mapped and converted on different communication protocols, in order to be able to cover a plurality of device types and bus systems.

The flexibility of the support for different communication protocols, such as MODBUS, FTP or EtherNet/IP and communication and/or transport media such as field bus, WLAN, USB or data carrier enables the addressing of the individual device properties, such as, for example, automation devices with limited resources and computation capacities, such as sensors, right up to intelligent automation devices such as Programmable Logic Controllers (PLC).

Moreover, it is provided that the device services are used for different domains such as firmware management, application management or configuration management.

The method according to the invention is moreover characterized, in comparison to the prior art, in that knowledge and information needed by the loading tool for the implementation of services for the communication with the automation devices are transferred.

This information is provided by the device connected to the loading tool in the form of device-specific loading information and delivered, as firmware-specific loading information, together with the data packet which is to be exchanged by means of the device. The data packet delivers the firmware-specific loading information, i.e., information on what can be done with the data. In the device, the device-specific loading information is provided, by means of which a group of possibilities is then formed, which are available for the actual loading process.

The approach avoids the need to update the software of the loading tool for new types of automation devices, since no device-specific software parts have to be implemented into the loading tool. Via the device services, different non-operative data exchange, with regard to the installation of, for example, firmware files, application files, parameter files, configuration files as well as diagnosis and other applications, are addressed with only one communication interface.

By means of the method according to the invention, a uniform behavior of the devices is achieved in spite of different device properties and communication interfaces. All the devices in which the device services are implemented behave in the same manner, regardless of which communication protocol or which transport mechanism is used. Required device-dependent specializations are achieved by device information at the level of the devices or data packet metadata at the level of the packet, which is made available to the loading tool and subsequently interpreted by the loading tool or the loading software. By this approach, an additional domain of device types and device classes is covered in a uniform manner. The device-dependent specializations also contain standardized data which can be understood generally or interpreted uniformly correctly.

Additional details, advantages and features of the invention result not only from the claims, from the features that can be obtained from said claims—separately and/or in combination—, but also from preferred embodiment examples that can be obtained from the following description of the figures.

Figure 4:
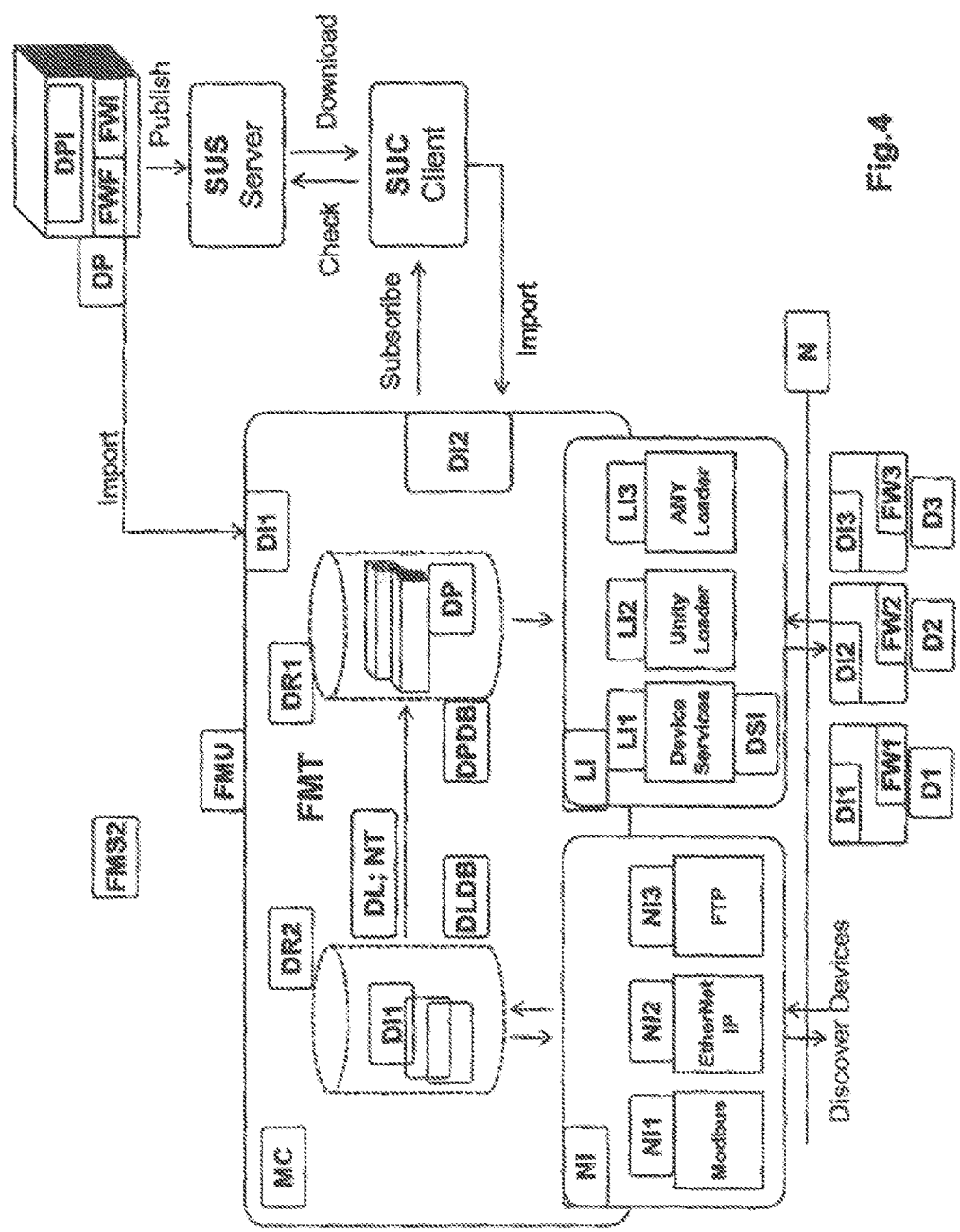
Figure 5:
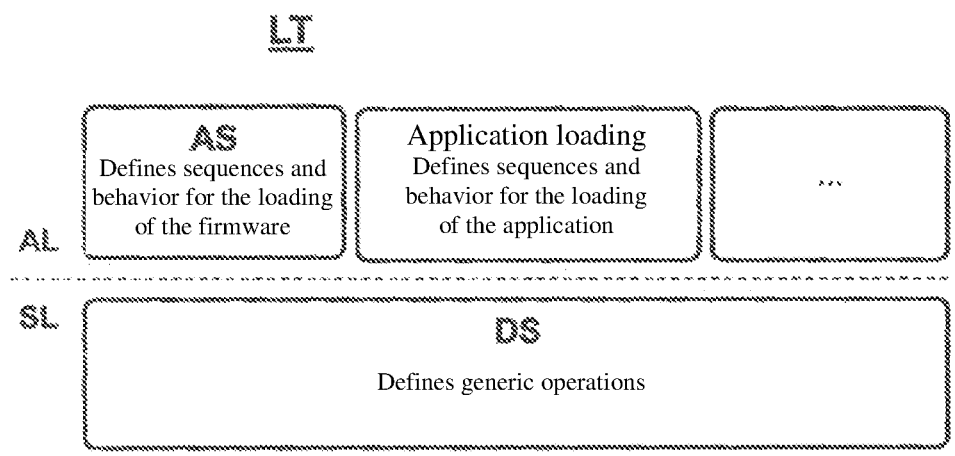
Figure 7A:
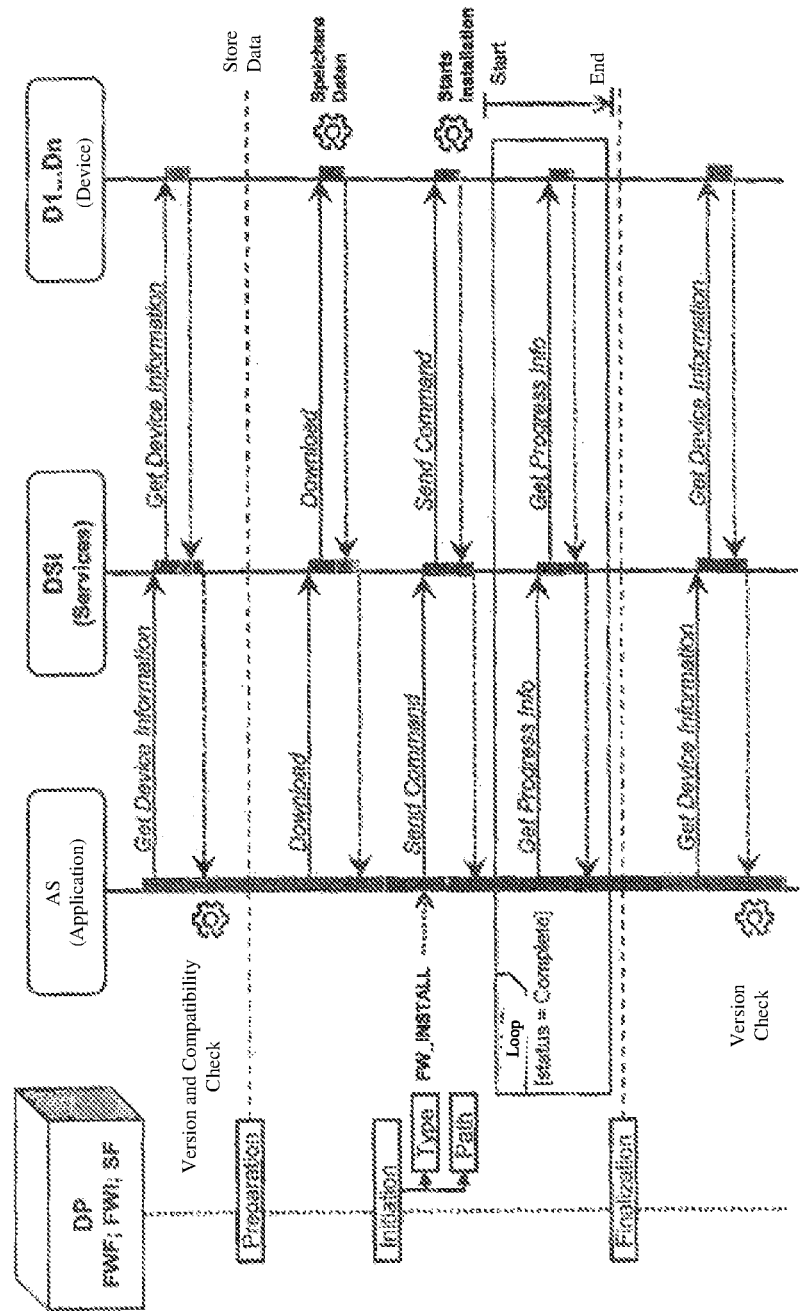
Figure 8:
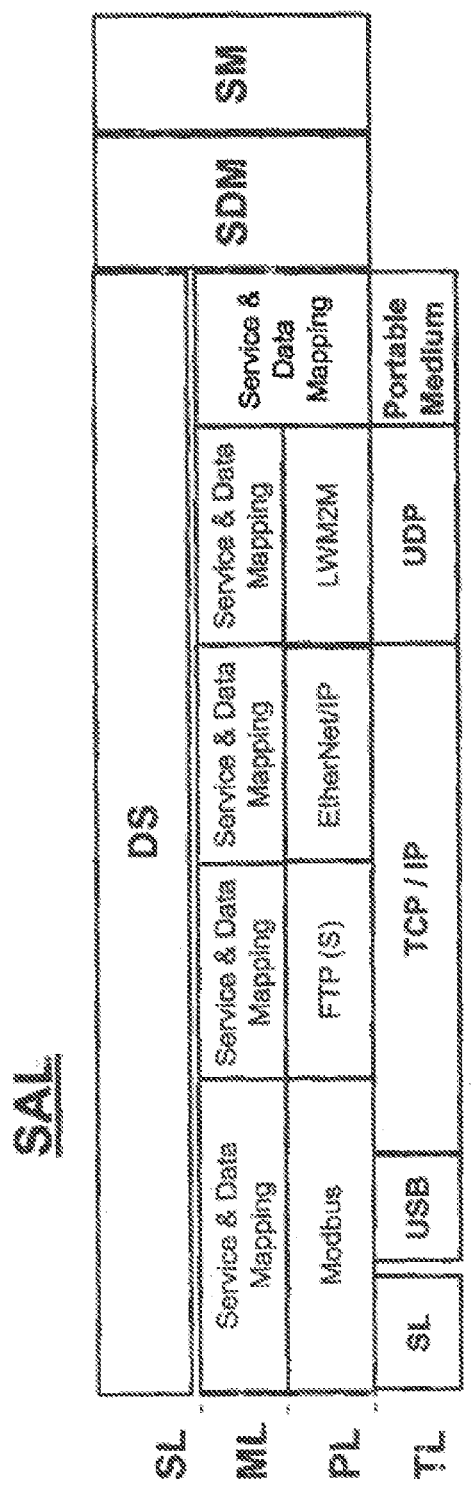
Figure 10:
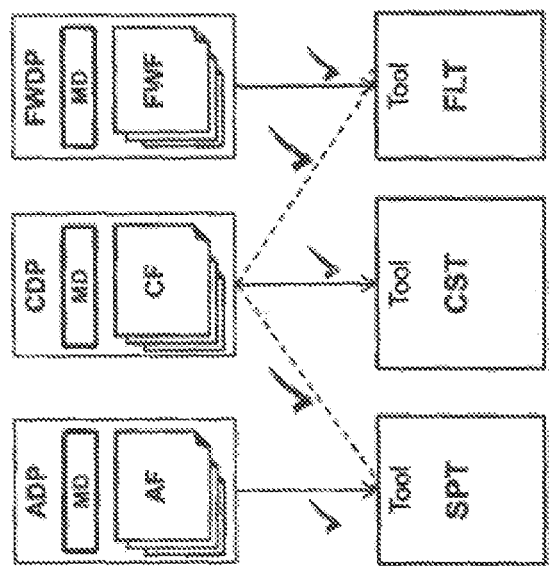
Figure 9:
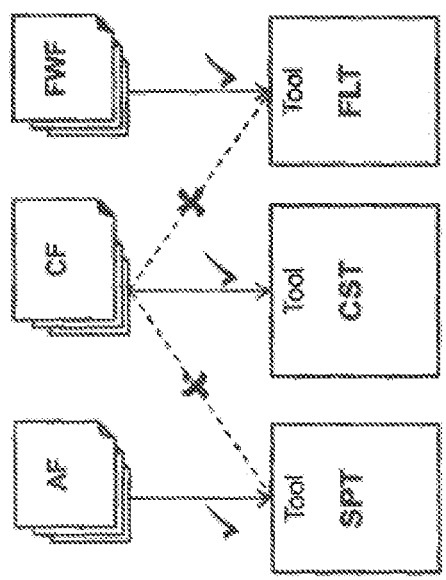
Figure 11:
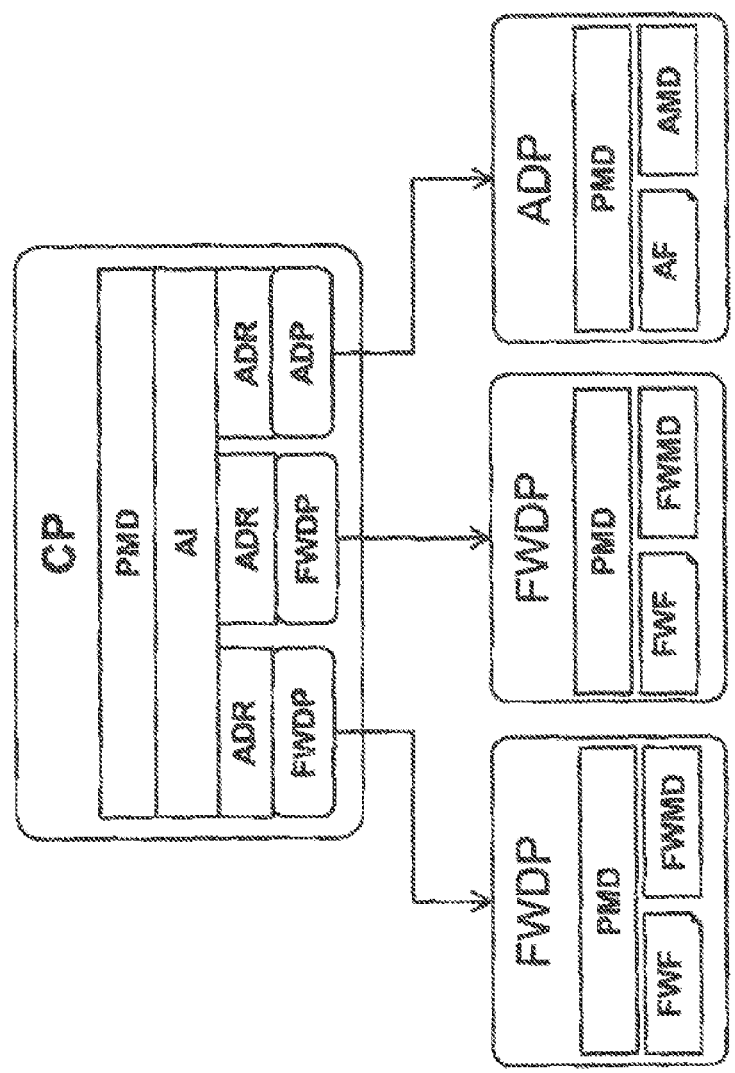

FIG. 1 shows a diagrammatic representation of a method for updating firmware of devices according to the prior art, FIG. 2 shows a diagrammatic representation of a system for updating firmware of devices according to the prior art, FIG. 3 shows a diagrammatic representation of a first embodiment of a firmware management system for updating firmware of a device according to the invention, FIG. 4 shows a diagrammatic representation of a second embodiment of a firmware management system, FIG. 5 shows a diagrammatic representation of an application and service layer architecture of the loading tool, FIG. 6 shows a diagrammatic representation of service domains of a device service infrastructure of the loading tool, FIG. 7a), b) show diagrammatic representations of communication diagrams between loading tool and automation device, FIG. 8 shows a diagrammatic representation of a service architecture layer, FIG. 9 shows a diagrammatic representation of a method for loading application, configuration and/or firmware data via different loading tools according to the prior art, FIG. 10 shows a diagrammatic representation of a method for loading data packets via different loading tools according to the invention, and FIG. 11 shows a diagrammatic representation of a data structure of data packets comprising packet metadata as well as firmware, configuration and/or application files.

FIG. 3 shows, in a diagrammatic representation, a first design of a firmware management system FMS1 for loading firmware files FWF via a loading tool LT into devices D1 . . . Dn having different device properties and/or device requirements. The devices D1 . . . Dn can be designed as simple sensors and/or actuators, programmable logic controllers (PLC), drives (Drives), measuring devices such as power meters for measuring current and voltage or switching devices. The firmware files FWF used are dependent on the device platform used and not uniform.

According to the invention, it is provided that the loading tool LT is designed so as to load the device-specific loading information DI, which contains firmware-specific loading information FWI and/or device properties or device requirements, which is needed in connection with the loading of the firmware file, from external data sources. Based on this information and on the knowledge obtained from the information, the download process and the data format used can be specialized without adaptation of a software of the loading tool LT, i.e., they can be adapted to the respective conditions of the target device.

According to the embodiment example represented in FIG. 3, the device property information DI can be provided in the device D1 . . . Dn and called up and loaded by means of the loading tool LT via a defined communication command which is supported by each respective individual device D1 . . . Dn.

Alternatively, the possibility exists that firmware designers and/or design experts record all the loading information LI necessary for the loading process together with the firmware files FWF in a data packet DP at the time of the creation of the firmware FW, which is then loaded into the loading tool LT. Before the actual firmware loading process, the loading information LI is then interpreted by the loading tool LT.

For providing a protocol-independent communication via a data connection N between the loading tool LT and the respective devices D1 . . . Dn, a device service infrastructure DSI is implemented in the loading tool LT, with generic data device services DS which define a common set of service domains such as, for example, loading service LS, information service IS, connection service CS, notification service NS and/or discovery service DCS, which are used in order to send or receive data and information from and to one of the devices D1 . . . Dn, respectively.

FIG. 4 shows purely diagrammatically a second embodiment according to the invention of a firmware management system FMS2 for updating firmware FW of devices D1, D2, D3 as well as automation devices, in particular actuators, sensors and/or control devices as well as energy management devices, in particular switching devices. The firmware management system FMS2 comprises a firmware management device FMU such as a personal computer or a mobile hand-held device comprising a data processing unit such as microcontroller MC, in which a firmware management tool FMT is implemented. The firmware management tool FMT has access to data storages DR1, DR2, which can be integrated in the firmware management device FMU or designed as external data storages.

Moreover, the firmware management device FMU comprises a data interface DI1 via which data packets DP can be imported into a database DPDB of the data storage DP1. The data packets DP each comprise firmware files FWF, firmware-specific loading information FWI as well as data packet information DPI.

Alternatively, the possibility exists of storing data packets DP on a software updating server SUS and of loading said data packets via a software update client SUC via a second data interface DI2 of the firmware management tool FMT into the database DPDB. This process can comprise both a manual and also an automatic (cyclic) checking or querying for new updates or updates that are not yet available—in accordance with the device list.

Moreover, the firmware management device FMU comprises an adaptable network interface NI, in which different communication protocols NI1, NI2, NI3 such as, for example, Modbus, EtherNet-IP or FTP can be implemented as so-called "Plug-Ins." The network interface NI is connected via a network N to the devices D1, D2, D3.

Furthermore, the firmware management tool FMT comprises a loading tool interface LTI for the implementation of different loading tools LT1, LT2, LT3 which provide different communication and transport mechanisms for the downloading of the data packets into the devices D1, D2, D3.

According to an inventive idea, it is provided that data packets DP imported via the data interface DI1 or via the data interface DI2 are stored in the data base DPDB of the data storage DR1.

An additional inventive feature provides that at least one of the network interfaces NI1, NI2, NI3 is designed in order to detect, in accordance with the characteristic of the network N, devices D1, D2, D3 of the network N and acquire the device-specific loading information DI1, DI2, DI3 thereof. The detected devices D1, D2, D3 as well as the device-specific loading information DI1, DI2, DI3 thereof are stored as a device list DL or network topology NT in a database DLDB of the second data storage DR2.

By means of the firmware management tool FMT, an analysis of the information contained in the databases DLDB, DPDB is carried out, wherein, on the basis of the device information DI1, DI2, DI3, which contains device ID information, current firmware version information, device type information, storage information and/or loading information, as well as the firmware-specific information FWI which contains information on which loading tool is to be used, a selection is made as to the device D1, D2, D3 in which the firmware FW1, FW2, FW3 is to be updated and the loading parameters and loading "Plug-in" with which this is to occur.

After the selection of a desired data packet DP, the corresponding information DI is selected from the database using the firmware management tool, which is suitable for the process of loading the firmware onto the device. The selection occurs based on data packet information DPI as well as firmware-specific loading information FI which are stored together with the firmware files FWF in the data packet DP. Here, the firmware-specific loading information contains, for example, target device information, firmware information, communication information as well as loading information and the knowledge as to which loading "plug-in" should or must be used.

The data packet(s) DP selected is/are then loaded by means of the firmware management tool FMT via the loading interface LI and a corresponding loading tool LT1, LT2 or LT3 into the target device D1, D2, D3.

By the analysis of the device list DL with associated device-specific loading information DI as well as by the analysis of the data packets DP, the firmware management tool FMT provides the possibility of automatically calling up and loading firmware updates for a device. Here, the automatic reception can occur via a "Subscribe" query to the software update client SUC, which looks on a software update server SUS for a data packet DP with the corresponding firmware updates. "Subscribe" here means that one registers oneself for a device and automatically receives new updates at the time of the next automated (regular, cyclic) query. Suitable data packets DP can then be loaded and imported via the software update client SUC into the database DPDB of the firmware management tool FMT.

The uniform or common database DPDB makes it possible to manage all the data within a database based on the intelligent data packets DP. The database can also be available externally and it does not have to be located on the same engineering system—for example, cloud for mobile devices or on a server in the Intranet. Intelligent data packet DP here is understood to mean that the packets contain data packet information DPI and firmware-specific loading information FI which can be evaluated so that the data packets DP can be selected for the corresponding target devices.

The data management comprises the storage of the data packets DP, DL, NT in a common environment, i.e., the databases DPDB, DLDB, and the providing of a common or uniform set of information in the form of data packet information DPI and/or firmware-specific loading information FWI for the different types of data contents.

A selection of a common or uniform database can be copied and used offline. Consequently, data retrieval can be simplified by introducing selection criteria based on data packet information DPI which is obtained in the data packet as packet metadata.

Due to the modular structure of the firmware management tool FMT, in particular the possibility of implementing network-interfaces NI1, NI2, NI3 as so-called "plug-ins," the firmware management tool FMT is capable of integrating or using different types of communication lines, communication approaches, communication protocols or communication mechanisms in order to interact with different devices D1, D2, D3 and different networks N. As a result, the complexity of the data processing with regard to the device communication is reduced. In addition, compatibility with older devices is supported, namely by the use of the "Plug In" concept which enables the embedding of older loading mechanisms or loading tools.

Independently thereof, a topology of different networks N can be generated by means of the firmware management tool FMT, as a result of which, for example, the available devices are reflected in an installation. Furthermore, the possibility is obtained of generating and storing an instantaneous record of the current network configuration. This enables one to retrieve earlier configurations of different networks or to work without being connected to the network at all, in order, for example, in order to prepare an updating of the firmware of different devices in a maintenance phase.

Moreover, the firmware management tool FMT offers the options of a data provider, for example, to act in an Intranet, in order to provide the processed and stored data to additional clients or customers.

It results from the above that the firmware management tool FMT provides unequivocal expertise, support and maintenance of a complete data life cycle with regard to the device domains. The firmware management tool improves the usability for the collection, management and for the downloading of all important information by means of a single firmware management tool FMT. Thus, the complexity for different domains of the information and data flow is reduced.

FIG. 5 shows purely diagrammatically an architecture of the loading tool LT comprising an application layer AL with application software AS as well as a service layer SL with device services DS. The application software AS defines sequences and behaviors relating to a defined flow chart such as:
  cached loading (firmware files or packets are first stored on devices and then installed from there),
  Direct Streamed Loading (the firmware files are transferred and installed bit by bit in individual files) and/or
  Loading via SD card or USB stick of the firmware update (firmware files/packet are copied to a portable medium and subsequently inserted into the target device and installed from there per communication command or device restart).

Moreover, the application software AS contains information on the use of device services DS in order to load the firmware files into the corresponding device D1 . . . Dn.

The service layer SL represents the device service infrastructure DSI with the generic services DS such as loading service LS, information service IS, connection service CS, notification service NS or discovery service DS, via which generic operations are defined.

FIG. 6 shows purely diagrammatically different service domains of the device service infrastructure DSI. Here, each service domain is used for a certain purpose. Dependencies exist here between the service operations and the service domains. For example, without the "Connect" service, no "Get Device Information" service can be executed. Consequently, for firmware loading, several service operations have to be combined with one another. The individual service operations are explained below.

Via the connection service CS, for example, a connection between the loading tool LT and the device is opened or closed, and the authorization is queried.

Via the information service IS, a protocol-independent communication with the device D1 . . . Dn is enabled; via communication commands such as "Get Device Information" or "Get Device Status," different types of static or dynamic device information are queried in the device.

Via the loading service LS, operations such as "Download," "Upload," "Send Command," as well as "Get Progress Info" are executed, for example, in order to load a data packet DP or data files from the loading tool LT into the device D1 . . . Dn. The possibility also exists of downloading data or data files from the device D1 . . . Dn, for example, in order to generate a backup of the device D1 . . . Dn. Via the command "Send Command," commands are sent to the device D1 . . . Dn and, via the command "Get Progress Info," progress information can be queried during the loading sequence.

By means of the notification service NS, via the operation "Send Notification," messages can be sent to the device D1 . . . Dn. The notification approach uses a loading process that is different from the usual loading processes and, which uses the loading services, information services as well as connection services. Depending on the incoming message, the device itself can decide what the follow-up activity is, for example, downloading of the firmware file from a server, or in accordance with a confirmation input made by the user.

Via the Discovery Service DCS, which is completely independent of other services, devices can be consistently found in a network.

FIG. 7a) shows purely diagrammatically a communication between the application software AS of the loading tool LT with the device D1 . . . Dn via the device service infrastructure DSI implemented in the loading tool LT on the basis of the "Cached Loading." In accordance with the obligatory connection structure, via the command "Connect," not represented in the figure), the application software AS queries device property information of the device D1 . . . Dn via the command "Get Device Information" of the information service IS. After the reception of the device property information, a comparison of the information occurs, in particular the finding of common loading possibilities. Independently thereof, a compatibility check is carried out in order to determine whether the firmware update is intended for the device at all and is installed.

In an additional step, the data packet DP is loaded from the loading tool LT by means of the "Download" operation of the loading service LS into the device. Subsequently, via the "Send Command" operation, commands are sent to the device in order to set said device in a status or mode that enables the data transfer and the firmware installation.

In the subsequent initiation phase, the installation command is sent via the application software AS of the loading tool LT of the "Send Command" operation to the device D1 . . . Dn, by means of which the installation of the firmware in the device is started. During the installation, a "Get_Progress_Info" command can be sent, in order to query the status of the firmware update.

After the end of the installation, the application software AS sends via the information service with the "Get Device Information" command, in order to check whether the update process of the firmware has occurred successfully.

FIG. 7b) shows purely diagrammatically an alternative communication between the application software AS of the loading tool LT and the device D1 . . . Dn, in which the loading process with the available adaptation possibilities has been adapted to the individual circumstances of the device. In this embodiment, in the data packet DP, in addition to the firmware files and the firmware-specific loading information, a script file is contained, via which the loading process of the firmware file can be controlled in accordance with the features of the device.

The additional method steps correspond to the method steps described in accordance with FIG. 7a).

FIG. 8 shows purely diagrammatically a service architecture SAL for carrying out a protocol conversion (mapping). Mapping is understood to mean that the generic device service operations are mapped to concrete protocols, in order to enable the communication via operations on a special protocol. Here, protocol-specific commands as well as data formats are used, to which both the service operations and also the operation-specific data are converted. However, the access by means of a tool or a software to the converted protocol always still occurs via the uniform and generic service interface and not via the protocol conversion itself.

The service architecture SAL comprises the service layer SL known from FIG. 5 as well as—under it—a mapping layer ML, a protocol layer PL as well as a transport layer TL. Generally, the individual layers of the service architecture SAL are coupled via a service data model SDM as well as a security model SM.

The device services DS of the service layer SL themselves are independent of protocol, in order to enable a uniform communication mechanism.

However, the device services DS can be converted to different protocols such as MODBUS, FTP (S), EtherNet/IP as well as LWM2M using service data mapping information DMI of the mapping layer ML. The individual communication protocols such as MODBUS, FTP (S) as well as EtherNet/IP each make available transport mechanisms such as SL, USB and/or TCP/IP of the transport layer TL. For the protocol LWM2M, UDP is used as transport mechanism.

Alternatively, the possibility also exists of using, as transport mechanism, a portable medium such as a USB stick or an SC card. The method according to the invention enables, in a simple way, the expansion to additional protocols and transport mechanisms.

According to a separate inventive idea, the invention relates to a standardized description of data such as application files, configuration files and/or firmware files in the form of a standardized data packet ADP, CDP, FWDP.

FIG. 9 shows the current situation, in which the application files AF, configuration files CF as well as firmware files FWF can only be processed via corresponding software tools SPT, CST, FLT.

According to the invention, data packets ADP, CDP, FWDP are defined, which contain the data in the form of application files AF, configuration files CF as well as firmware files FWF, and to which, in addition, packet metadata MD is added, which describes the content as well as the structuring of the content of the data packets ADP, CDP, FWDP in a general form. As a result, different types of content in a uniform form and the data packets can be used uniformly in different tools SPT, CST, FLT and/or systems. In other words: the metadata of the data packets ADP, CDP, FWDP contains knowledge on the content thereof.

Moreover, the data packets ADP, CDP, FWDP contain information on the intended purpose and special features (dependencies, compatibility aspects) of the content thereof. This information is contained in the data packet by means of an expanded or specialized metadata description. The information is dependent on the content type. This means that for each type a distinct standardized metadata description scheme or syntax is defined. This includes, for example, the recipient address as well as the purpose thereof. In addition, special rooting paths for sub-modules or sub-networks, for example, can be communicated in the data packet description.

The data packets also contain information on how the data is to be used or applied, for example, how the data or the data packet can be exchanged by means of devices, or how a software library can be installed on the target device. Furthermore, in the data packets, command lists can be contained, which enable the processing tool SPT, CST, FLT or the respective device to execute a sequence of necessary steps. The data packets ADP, CDP, FWDP moreover describe which necessary requirements must be complied with for the use or application of the content of the data packets by means of the target device. In addition, the data packet contains information on the compatibility and dependencies that need to be taken into consideration when the content is used.

Via a common packet frame, the internal file organization and the outer appearance are defined. Anyone can identify the data packet and knows precisely where certain files are placed in the data packet.

The data packets are defined as basic and specified parts. This enables the expandability for new domains or requirements in a simple manner. A data packet can describe different types of data contents in the usual manner, such as, for example, firmware updates, software libraries, configuration data or device applications.

Moreover, several data packets can be combined in a container packet, for example, in order to provide data contents for different target devices such as, for example, for all the automation devices of a production system or sector.

By means of the data packets according to the invention, it is possible to describe different data content types in a general manner, so that all the components or entities participating in the communication sequence know precisely how to interpret the data in order to obtain the required or necessary information.

The data packets themselves should designated as of intelligent type, since they describe both the content thereof and also contain information on how to interpret and handle the content. The data packets deliver different types of information in order to be able to also execute the data content. In this connection, it should be noted that the knowledge concerning the data and on the use thereof is provided by means of the data packet itself and not by the processing tool SPT, CST and FLT. The tool only needs to provide the necessary generic services and also the general (basic) process flow and call-up sequences thereof.

FIG. 11 shows in a diagrammatic representation the structure of the data packets ADP, CDP, FWDP as well as their incorporation in a container packet CP. The container packet contains packet metadata PMD which contains user-specific information on what a user can do with the individual data packets ADP, CDP, FWDP.

Via an assignment layer AL an assignment via address ADR to the desired data packets ADP, CDP, FWDP occurs.

The above-described content description of the respective data packet is contained in so-called packet metadata PMD which, within the data packet, refers to specific or specified metadata such as firmware metadata FWMD or application metadata AMD, which contains a specified content description on how the files contained in the respective data packets ADP, CDP, FWDP, such as firmware files FWF or application files AF, are to be treated, in particular which loading mechanisms should be followed, or, in the case of application data, which dependencies should be taken into consideration

The invention claimed is:

1. A method for updating firmware of a device with different device-specific loading information by means of a single loading tool, comprising:
providing at least one firmware file;
loading the at least one firmware file into the single loading tool;
providing a loading information for a loading process for transferring the firmware file into the device, wherein the loading information is saved hived-off from the single loading tool in at least one external data source;
providing the loading information as a firmware-specific loading information of the firmware file to be transferred, and as a device-specific loading information of the device to be updated;
loading the loading information into the single loading tool, wherein the device-specific loading information is loaded from the device to be updated, as a first data source, via a communication command, into the single loading tool, and wherein the firmware-specific information with the firmware file, stored in a data packet, is loaded from a second external data source into the single loading tool;
connecting the single loading tool to the device via a wired or wireless communication mechanism; and
starting the loading process for transferring the firmware file via a communication interface of the single loading tool into the device,
selecting a loading process with compatible loading information supported by the device and the firmware file by comparing the firmware-specific loading information with the device-specific loading information, and
establishing the communication interface of the single loading tool corresponding to the compatible loading information,
wherein the firmware-specific loading information and the device-specific loading information is interpreted before a start of the loading process by the single loading tool, and
wherein the firmware of the device is updated using the single loading tool without performing adaptations of software of the single loading tool.

2. The method according to claim 1, wherein the device-specific loading information and the firmware-specific loading information are provided in a data packet and loaded into the single loading tool.

3. The method according to claim 1, wherein the firmware-specific loading information contains information selected from the group consisting of type and identification number of the device, firmware version information, communication protocol information, device mode information, and installation information.

4. The method according to claim 1, wherein the device-specific loading information contains information selected from the group consisting of device ID information, current firmware version information, status information, storage information, communication protocol information, loading mode information, and installation information.

5. The method according to claim 1, wherein a communication between the single loading tool and one or more different devices occurs via a uniform service communication interface with generic services, wherein the services define a common set of device services, via which data and/or information in the form of service operations from and to the device is sent and received, respectively.

6. The method according to claim 1, wherein protocol-independent device services are used.

7. The method according to claim 5, wherein the device services are converted using different communication protocols and transport mechanisms.

8. The method according to claim 1, wherein, as communication protocols, MODBUS, FTP(S), EtherNet/IP and/or LWM2M are used.

9. The method according to claim 5, wherein the communication of the single loading tool with the device and/or external data sources occurs via the device services, wherein the device services provide a set of generic services selected from the group consisting of connection service, information service, data exchange service, notification service, and/or diagnosis service.

10. The method according to claim 1, wherein the firmware file and/or the loading information is loaded into the device via a wired, or wireless, communication mechanism, or via a mobile data carrier.

11. The method according to claim 1, wherein device services of a device service infrastructure are used for different tasks selected from the group consisting of firmware management, application management, and configuration management.

12. The method according to claim 1, wherein the device is an automation device or an energy management device.

13. The method according to claim 10, wherein the wired or wireless communication mechanism is a fieldbus or a WLAN.

14. The method according to claim 10, wherein the mobile data carrier is a USB stick or an SD card.

* * * * *